United States Patent [19]

Beals

[11] 4,135,044

[45] Jan. 16, 1979

[54] PROCESS FOR ACHIEVING HIGH CONVERSIONS IN THE PRODUCTION OF POLYETHYLENE

[75] Inventor: Charles D. Beals, Baton Rouge, La.

[73] Assignee: Exxon Research & Engineering Co., Florham Park, N.J.

[21] Appl. No.: 840,870

[22] Filed: Oct. 11, 1977

Related U.S. Application Data

[63] Continuation-in-part of Ser. No. 822,639, Aug. 8, 1977, abandoned, which is a continuation of Ser. No. 736,513, Oct. 28, 1976, abandoned.

[51] Int. Cl.² .................. C08F 110/02; C08F 4/30; C08F 4/34; C08F 4/04
[52] U.S. Cl. .......................... 526/64; 526/86; 526/87; 526/88; 526/352.2
[58] Field of Search .................. 526/64, 86, 87, 88

[56] References Cited

U.S. PATENT DOCUMENTS

| | | | |
|---|---|---|---|
| 3,334,081 | 8/1967 | Madgwick et al. | 526/64 |
| 3,399,185 | 8/1968 | Schappert | 526/64 |
| 3,405,115 | 10/1968 | Schappert et al. | 526/64 |
| 3,551,397 | 12/1970 | Ratzsch et al. | 526/86 |
| 3,628,918 | 12/1971 | Beals et al. | 526/64 |
| 3,725,378 | 4/1973 | Chamberlin | 526/64 |
| 3,812,090 | 5/1974 | Peters | 526/64 |
| 3,917,577 | 11/1975 | Trieschmann et al. | 526/64 |
| 4,042,767 | 8/1977 | Payer et al. | 526/64 |

FOREIGN PATENT DOCUMENTS

| | | | |
|---|---|---|---|
| 956738 | 4/1964 | United Kingdom | 526/64 |
| 1010847 | 11/1965 | United Kingdom | 526/86 |

Primary Examiner—Alan Holler
Attorney, Agent, or Firm—H. E. Naylor; M. B. Kurtzman

[57] ABSTRACT

Polyethylene is produced by polymerization of ethylene alone or with comonomers and/or telogens (modifiers) in an elongated tubular reactor having an inlet and outlet and preferably containing four reaction zones. Conversions of up to 40% are achieved without loss of optical or physical product quality.

12 Claims, 1 Drawing Figure

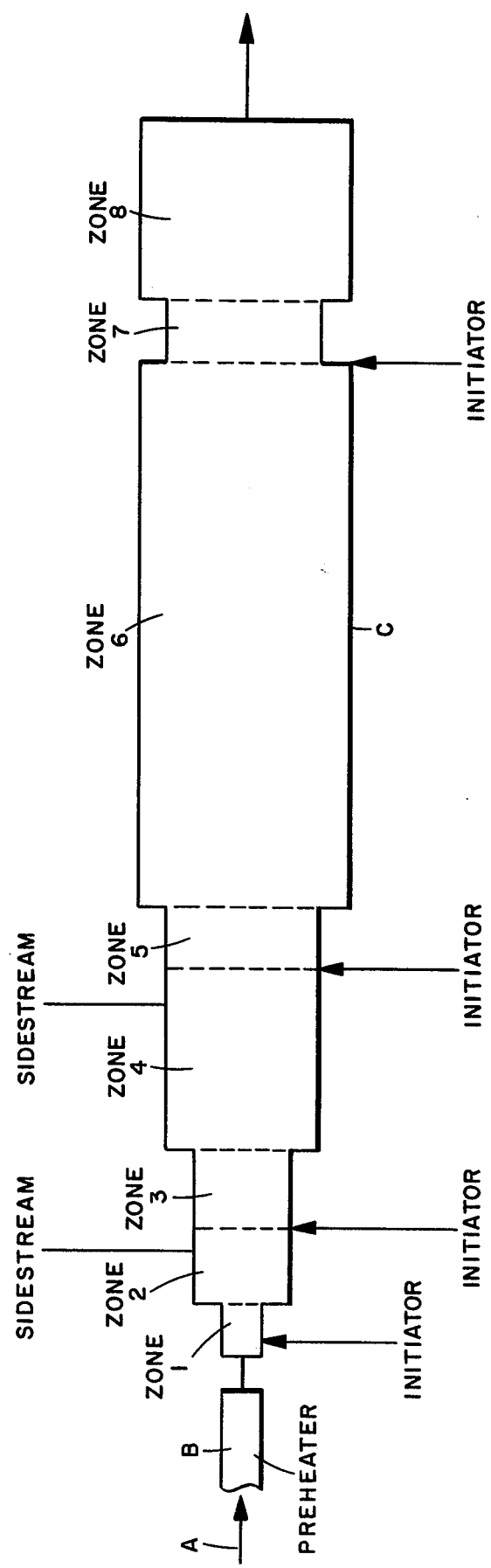

PROCESS FOR ACHIEVING HIGH CONVERSIONS IN THE PRODUCTION OF POLYETHYLENE

This application is a continuation-in-part of Ser. No. 822,639, filed Aug. 8, 1977, and now abandoned, which in turn was a continuation of Ser. No. 736,513, filed Oct. 28, 1976 and now abandoned.

BACKGROUND OF THE INVENTION

The instant invention relates to a process for the polymerization of ethylene alone or with comonomers and/or telogens (modifiers) at elevated temperatures and pressures in an elongated tubular reactor wherein relatively high conversions are obtained without loss of optical or physical product quality.

The polymerization of ethylene to solid polyethylene in an elongated tubular reactor at elevated temperatures and pressures in the presence of free radical or free oxygen producing initiators that decompose at or below the polymerization temperature to generate free radicals is well known in the art. Various types of tubular reactor systems have been developed and are in commercial use. One of the more basic systems encompasses feeding a pressurized stream consisting of ethylene, initiator and optionally a modifier into one end of a tubular reactor consisting of one reaction zone and one cooling zone. Owing to the exothermic nature of the reaction, the temperature increases as the reaction proceeds to a maximum or peak temperature and considerable heat is evolved. Heat control methods must be employed to prevent violent run away reactions and explosions as well as to increase conversions. One method for achieving heat control involves the use of a long tubular reactor wherein some measure of temperature control is obtained from the relatively large ratio of heat dissipating surface to reactor volume. Thus, heat control is also accomplished by providing the reactor with a cooling jacket.

It has also been discovered that effective control of the polymerization reaction can be maintained together with an increase in conversion if instead of introducing ethylene at one point in the reactor, it is injected as sidestreams at one or more additional points downstream in the reaction tube. The injected ethylene is made to serve both as a coolant and as a monomer for further polymerization. See U.S. Pat. No. 3,725,378.

Another process using multiple sidestreams which is incorporated herein by reference is disclosed in U.S. Pat. No. 3,628,918. This patent discloses three reaction zones, three cooling zones and two monomer sidestreams; one introduced prior to the second reaction zone and the other introduced prior to the third reaction zone in a tubular reactor having a larger diameter for the cooling zones than that of the reaction zones.

Generally, all of the conventional polymerization systems attempt to achieve the highest level of conversion without loss of optical and physical properties of the resulting polymer. For example, the two reaction zone and three reaction zone processes discussed above can achieve about 20 to 25 percent conversion. It has heretofore been assumed and observed by those skilled in the art that when conversion levels about 25 percent are achieved, both optical and physical properties rapidly deteriorate regardless of the pressure and temperature histories achieved.

The quality of polyethylene particularly haze is affected by a number of mechanisms. Haze increases with increasing high molecular weight components. By maintaining a high flow number and preferably a flow number greater than 3.3 ft$^2$/sec. one obtains the greatest percent of turbulent flow and thereby minimizes long straight chains which are formed dominantly during the laminar flow. On the other hand increase in reaction zone average pressure improves haze by decreasing the amount of long chain branching thereby decreasing the high molecular weight component in the molecular weight distribution. An increase in reaction zone average or peak temperatures increases long chain branching of the polymerization reaction. The increased high molecular weight component in the molecular weight distribution results in increased haze. Additionally, the increase in polymer concentration obtained through higher conversions was known to generally cause an increase in the opportunity for the long chain branches to form on existing polymer molecules. Thus, it has generally been accepted that high conversions lead to greater long chain branches and hence reduce haze quality, i.e., higher haze.

SUMMARY OF THE INVENTION

In accordance with this invention it has been unexpectedly discovered that one may obtain a significant increase in conversion while maintaining high quality haze or an even greater increase in conversion with a slight increase in haze value. More particularly, it has been unexpectedly discovered that the pressure and temperature history of the reaction mass during the polymerization reaction in a tubular reactor is more significant in determining product quality than the absolute level of conversion obtained. It is therefore possible to obtain high quality product while obtaining greater than 25% conversion of the monomer reaction mass to polymer. That one could obtain high quality at greater than 25% conversion is contrary to that previously conceived by those skilled in the art. These high conversions are achieved by use of a tubular reactor comprised of a plurality of reaction zones followed by cooling zones wherein a monomer sidestream is introduced at least after first and second reaction zones while still maintaining a monomer feed stream through the inlet of the reactor and in accordance with the invention the use of an additional reaction and cooling zone accompanied by a decrease in the operating temperatures in the previous reaction zones. It is preferred that the flow number be kept greater than about 3.3 ft$^2$/sec. in the reaction zones and that the pressure drop in the tubular reactor, between the inlet of the first reaction zone and the outlet of the last reaction zone, not to exceed about 6000 psi when operating at preassures between 25,000 and 50,000 psi at the inlet of the first reaction zone. The flow number as used herein means the bulk fluid velocity in ft/sec. times the diameter in feet.

BRIEF DESCRIPTION OF DRAWINGS

The present invention will be further illustrated by reference to the drawings in which:

FIG. 1 is an illustration of a tubular reactor having four reaction zones in accordance with an aspect of the invention and also provided with sidestreams and different diameter tubes to provide high conversion, reaction zone boundary layer control and pressure drop control.

DETAILED DESCRIPTION

In accordance with this invention there is provided a process for producing polyethylene or copolymers of ethylene in an elongated tubular reactor having an inlet and an outlet, at a pressure of about 20,000 psi to about 60,000 psi comprising passing the reaction mass through a plurality of reaction zones at a flow number of at least about 3.3 ft$^2$/sec., each reaction zone followed by a cooling/repreparation zone, and wherein free radical producing substance is injected at the beginning of each reaction zone, the improvement comprising adding at least one additional final reaction zone and cooling zone and decreasing the operating temperatures in the previous reaction zones whereby there is obtained at least 28% conversion of ethylene to polyethylene while maintaining product haze value.

Preferably, the reactor comprises three or four reaction zones with or without the use of cold gas injection to facilitate cooling. However, in accordance with this invention four or more reaction zones may be utilized. The unexpected aspect of this invention is that one may add additional reaction zones to the prior art processes and obtain increased conversion of monomer to polymer without deterioration of product quality by decreasing the operating temperature ranges in the previous reaction zones.

More specifically, a conventional tubular reactor comprising two reaction zones may be converted to a three reaction zone process with a 6 to 10% conversion increase and the maintenance of haze value by adding a third reaction zone, lowering the operating temperature in the first two reaction zones by about 40° F. to about 70° F. or approximately 15 to 20% ΔT reduction however within accordance with this invention greater or lesser reductions may be employed such as 5 to 30% Δt reduction and minimizing pressure differences between reaction zone, i.e. maintaining the least amount of pressure drop so as to operate at a maximum average pressure. More preferably, a conventional three reaction zone tubular reactor containing one or two cold side streams can be converted to a four reaction zone tubular reactor with two cold gas cooling streams to obtain 28% or greater conversion while maintaining high quality product, more particularly high quality haze by lowering the operating ΔT in the first three reaction zones from about 60° F. to about 90° F. or approximately 15 to 20% ΔT reduction.

In the event haze is not a limiting criteria, even greater conversion increases may be obtained (up to 10 to 12% conversion increases) due to the less restrictive temperature reductions in the early sections of the reactor and the positive affects of having full use of the additional reaction zone for increase in conversion. In all cases, however, pressure drop minimization is employed for maximizing uniformity of the product made in each subsequent zone.

The present invention is not limited to any specific tubular reactor design, modifier, comonomer system, operating pressure or temperature variables, or initiator system, but it is preferred that the pressure drop throughout the reactor is kept below about 6,000 psi from the inlet of the first reaction zone to the outlet of the last reaction zone and the flow number kept above about 3.3 ft$^2$/sec. as disclosed in U.S. application No. 625,415, filed Oct. 24, 1975 which is incorporated herein by reference.

The tubular reactor may be an elongated jacketed tube or pipe, usually in section or blocks, of suitable strength and having inside diameter of about 0.50 to 3 inches, preferably about 1.0 to 2.5 inches. The tubular reactor usually has a length to diameter ratio of about 1000 to 1, to 60,000 1. The specific length employed depends upon the specific tubing configuration used in the final application of the design, as required for sufficient heat removal.

The tubular reactor is operated at pressures from about 20,000 to 60,000 psi. Although pressures higher than 60,000 psi can be used, it is preferred that the pressure be about 30,000 to 50,000 psi.

The temperature maintained in the reactor is variable and is primarily controlled by and dependent on the specific initiator system employed. Temperatures are usually within the range of about 150° to 350° C. or higher, preferably about 160° to 327° C. or higher, more preferably about 165° to 315° C. and varies in the different reaction zones.

Initiators suitable for use in the instant invention are free radical producing substance. Non-limiting examples of such free radical producing substances include oxygen; peroxide compounds such as hydrogen peroxide, decanoyl peroxide, t-butyl peroxy neodecanoate, t-butyl peroxypivalate, 3,5,5-trimethyl hexanoyl peroxide, diethyl peroxide, t-butyl peroxy-2-ethyl hexanoate, t-butyl peroxy isobutyrate, benzoyl peroxide, t-butyl peroxy acetate, t-butyl peroxy benzoate, di-t-butyl peroxide, and 1,1,3,3-tetramethyl butyl hydroperoxide; alkali metal persulfates, perborates and percarbonates; and azo compounds such as azo bis isobutyronitrite. Preferred are organic peroxides.

It is understood that mixtures of the above initiators may be injected into the various reaction zones. It is also understood that the initiator or initiators may be introduced directly into the main ethylene stream or in conjunction with a side ethylene stream or at such points where the reaction mixture is at the proper temperature for initiation or to reinitiate the polymerization reaction.

The feedstock employed in the present invention may be ethylene or predominantly ethylene together with a telogen (modifier) or comonomer. Known telogens or modifiers, as the term is used herein, are illustrated by the saturated aliphatic aldehydes, such as formaldehyde, acetaldehyde and the like, the saturated aliphatic ketones, such as acetone, diethyl ketone, diamyl ketone, and the like, the saturated aliphatic alcohols, such as methanol, ethanol, propanol, and the like, paraffins or cycloparafins such as pentane, hexane, cyclohexane, and the like, aromatic compounds such as toluene, diethylbenzene, xylene, and the like, and other compounds which act as chain terminating agents such as carbon tetrachloride, chloroform, etc.

The process of the present invention may also be used to produce copolymers of ethylene with one or more polymerizable ethylenically unsaturated monomers having a

group and which undergo addition polymerization. These copolymers may be produced with or without modifiers present. Polymerizable ethylenically unsaturated monomers having a

group and which undergo addition polymerization are, for example, alpha monoolefins, such as propylene, butenes, pentenes, etc., the acrylic, haloacrylic and methacrylic acids, esters, nitriles, and amides such as acrylic acid, chloroacrylic acid, methacrylic acid, cyclohexyl methacrylate, methyl acrylate, acrylonitrile, acrylamide; the vinyl and vinyl-idene halides; the N-vinyl amides; the vinyl carboxylates, such as vinyl acetate; the N-vinyl aryls, the vinyl aryls such as styrene; the vinyl ethers, ketones or other compounds, such as vinyl pyridine, and the like. Comonomers and telogens or modifiers are used to modify the properties of the ethylene polymer produced. Accordingly, the term polyethylene, as used herein is meant to include the so modified ethylene polymers as well as homopolyethylene.

Haze is a product property which varies depending on the reactor design and operating conditions. For high clarity polyethylene film applications a haze in the range of about 3.5 to 5.0 percent is generally required. For medium clarity film applications a haze in the range of about 5.0 to 7.5 is generally required. Haze properties as heretofore explained normally deteriorate with an increase in operating temperature, a decrease in operating pressure, and/or an increase in polymer conversion. Surprisingly, the instant invention leads to conversions higher than that thought possible in the art while maintaining equivalent or superior haze properties over that of conventional lower conversion processes. The higher conversions are possible for example by converting a three reaction zone tubular reactor to a four reaction zone tubular reactor with the judicious selection of the operating pressure and temperature ranges, i.e. minimization of pressure drop and decreasing the operational peak temperatures of the first three reaction zones. Generally, as the fluid moves through the reactor the resulting product obtained has a higher and less acceptable haze value owing to the pressure decrease, residence time at high temperature and the free radical attack of the existing polymer at each additional initiator injector point; this leads to side branching reactions, thus leading to an increase in haze. Therefore, it would be unexpected to obtain, at high conversions and in a four reaction zone reactor, an ethylene polymer with acceptable optical and physical properties for clear film applications. The term haze as used in the instant specification and claims is the percentage of transmitted light which in passing through a polymer specimen herein deviates from the incident beam by forward scattering as measured by ASTM-D-1003-61.

Acceptable physical properties of the polymers produced by the instant invention include a density of about 0.91 to 0.935 gm/cm$^3$, preferably about 0.92 to 0.93 gm/cm$^3$ and a melt index of about 0.1 to 40, preferably about 0.3 to 30.

The melt index of the polymer herein is determined as the weight of resin, expressed in grams; that is, extruded in ten minutes at 180° C. through a standard orifice when a standard load is applied on the molten polymer. See ASTM-D-1238-57T.

To illustrate the present invention in all of its aspects, a tubular reactor for the production of polyethylene is illustrated in FIG. 1. The feed gases are introduced through line A to a preheater which heats the feed to its initiation temperature. The tubular reactor has eight zones having an internal diameter from 0.5 to 3.0 inches. Four zones (1, 3, 5 and 7) are reaction zone and are smaller in diameter by approximately 0.25 inches than the four cooling zones 2, 4, 6 and 8. Initiator is introduced after the preheater and also at the end of cooling zones 2, 4 and 6 after a minimum initiation temperature is reached. Monomer sidestream feeds for cooling and reducing pressure drop are also introduced toward the end of cooling zones 2 and 4. Table I sets forth the internal diameter of the tubes in each zone, the calculated bulk fluid velocities of each zone and the calculated flow number in each reactor zone for a particular design. In any particular design, the diameters of the various zones will vary within the tube size ranges previously mentioned.

TABLE I

|  | Internal Diameter (inches) | Bulk Fluid Velocity (ft/sec) | Flow Number |
|---|---|---|---|
| Zone 1 | 1.25 | 46 | 4.85 |
| Zone 2 | 1.50 | 32 | 4.04 |
| Zone 3 | 1.50 | 48 | 6.10 |
| Zone 4 | 1.75 | 36 | 5.20 |
| Zone 5 | 1.75 | 48 | 6.90 |
| Zone 6 | 2.00 | 36 | 6.0 |
| Zone 7 | 1.75 | 48 | 6.90 |
| Zone 8 | 2.00 | 36 | 6.00 |

The ratio of injected sidestream monomer feed to inlet monomer feed must be regulated to provide maximum utilization of the cooling available in the feed stream while at the same time effecting the desired heat distribution to maintain the polymerization reaction at desired operating temperatures and polymerize some of the incoming monomer. With too large a ratio of sidestream injected into the inlet monomer, for example, the temperature after mixing may be well below the initiation temperature of certain initiators and in such cases additional heat would be needed to bring the mixture back up to initiation temperature range.

The temperature of the injected monomer depends upon the ratio of the latter to the inlet monomer and should be kept as low as practical to secure optimum cooling. Monomer cooled below ambient temperature may be used to provide a large heat reservoir. However, the lowest temperature to which the injected monomer feed can be cooled with any given number of injection points is governed also by the resultant temperature of the reaction mixture after injection, which in turn depends to some extent upon the initiator system employed. Thus, the specific formula for optimum operating conditions is different in every design case and varies for different product property requirements. The flow rate, flow split between injected and inlet monomer, injected monomer feed temperature, gas and injection point locations, initiator must be related to the particular design and initiator system used for a given set of desired polymerization temperature and pressure conditions. These are readily subject to calculation by those skilled in the art.

What is claimed is:

1. In a process for producing polyethylene in an elongated tubular reactor having an inlet and an outlet, at a pressure of about 20,000 psi to about 60,000 psi comprising passing the reaction mass through a plurality of reaction zones at a flow number of at least about 3.3 ft²/sec., each reaction zone followed by a cooling/repreparation zone, and wherein free radical producing substance is injected at the beginning of each reaction zone, the improvement comprising adding at least one additional final reaction zone and cooling zone and decreasing the operating temperatures in the previous reaction zones whereby there is obtained at least a 28% conversion of ethylene to polyethylene while maintaining product haze value.

2. The process of claim 1 wherein a sidestream of ethylene is injected into the first and second cooling zones.

3. The process of claim 1 wherein the operating pressures can be between 25,000 psi and 50,000 psi.

4. The process of claim 1 wherein the pressure drop across the length of the reactor from the inlet of the first reaction zone to the outlet of the last reaction zone does not exceed 6,000 psi.

5. The process of claim 1 wherein the flow number is at least 4.0 ft²/sec.

6. The process of claim 1 wherein the haze value is about 3.5 to about 7.5.

7. The process of claim 1 wherein the decrease in operating temperature range is about 15 to 20%.

8. The process of claim 2 wherein the tubular reactor comprises four reaction zones and cooling/repreparation zones.

9. The process of claim 1 wherein the decrease in operating temperature range is about 5 to 30%.

10. The process of claim 1 wherein the tubular reactor comprises three or four reaction zone and three or four cooling/repreparation zones and no ethylene sidestreams.

11. The process of claim 1 wherein the tubular reactor comprises three reaction zones and the operating temperature range in the first two reaction zones is reduced by about 40° to 70° F.

12. The process of claim 1 wherein the tubular reactor comprises four reaction zones and the operating temperature range in the first three reaction zones is reduced by about 60° to 90° F.

* * * * *